US012631397B2

(12) United States Patent
Chen

(10) Patent No.: US 12,631,397 B2
(45) Date of Patent: May 19, 2026

(54) POWDER-MATERIAL FLYING MELTING FURNACE HAVING DUAL REGENERATIVE CHAMBERS

(71) Applicant: Zhiwei Chen, Pingxiang (CN)

(72) Inventor: Zhiwei Chen, Pingxiang (CN)

( * ) Notice: Subject to any disclaimer, the term of this patent is extended or adjusted under 35 U.S.C. 154(b) by 568 days.

(21) Appl. No.: 18/114,978

(22) Filed: Feb. 27, 2023

(65) Prior Publication Data

US 2023/0280097 A1 Sep. 7, 2023

Related U.S. Application Data

(63) Continuation of application No. PCT/CN2021/114517, filed on Aug. 25, 2021.

(30) Foreign Application Priority Data

Aug. 26, 2020 (CN) .......................... 202010918492.8

(51) Int. Cl.
*F27D 17/00* (2025.01)
*C03B 3/02* (2006.01)
(Continued)

(52) U.S. Cl.
CPC .............. *F27D 17/10* (2025.01); *C03B 3/023* (2013.01); *C03B 5/167* (2013.01); *C03B 5/237* (2013.01); *F27B 14/0806* (2013.01); *F27D 7/02* (2013.01)

(58) Field of Classification Search
CPC . F27D 17/10; F27D 7/02; F27D 17/00; F27D 17/20; C03B 3/023; C03B 5/167;
(Continued)

(56) References Cited

U.S. PATENT DOCUMENTS 3,870,474 A * 3/1975 Houston ................. F23G 7/068
422/177
4,528,012 A * 7/1985 Sturgill ................... F28D 17/02
432/180
(Continued)

FOREIGN PATENT DOCUMENTS

CN 203127790 U 8/2013
CN 105396379 * 3/2016 ............. F27D 17/20
(Continued)

OTHER PUBLICATIONS

CN105396379, Chen, Method and Furnace for Producing Combustible Gas, Mar. 16, 2016 (Year: 2016).*
(Continued)

*Primary Examiner* — Jessee R Roe
*Assistant Examiner* — Michael Aboagye

(57) ABSTRACT

The present invention provides a powder-material flying melting furnace having dual regenerative chambers, which can be widely used in the fields of glass production, iron-making, non-ferrous metal smelting and solid fuel gasification. In the powder-material flying melting furnace having dual regenerative chambers of the present invention, a blow gas inlet is provided in a common feed pipeline or a raw material feeding pipeline, a forced feeding equipment is arranged on the feed inlets, and the raw material feeding pipeline is configured to be a movable feeding pipeline, such that the melts can be effectively prevented from being condensed and bonded on the inner walls of the feeding inlets.

10 Claims, 6 Drawing Sheets

(51) Int. Cl.

| | |
|---|---|
| *C03B 5/167* | (2006.01) |
| *C03B 5/237* | (2006.01) |
| *F27B 14/08* | (2006.01) |
| *F27D 7/02* | (2006.01) |
| *F27D 17/10* | (2025.01) |

(58) Field of Classification Search
CPC ..... C03B 5/237; C03B 5/235; F27B 14/0806; F27B 14/00; Y02E 60/14; Y02P 40/50; F28D 20/00
USPC ......................................................... 266/155
See application file for complete search history.

(56) References Cited

U.S. PATENT DOCUMENTS

| | | | | |
|---|---|---|---|---|
| 5,074,906 A | * | 12/1991 | Granstrom | .............. C21C 5/565 75/10.36 |
| 5,453,259 A | * | 9/1995 | D'Souza | ................. F23G 7/068 423/245.3 |
| 5,569,312 A | * | 10/1996 | Quirk | .................... B01D 53/56 110/212 |

| | | | | |
|---|---|---|---|---|
| 6,183,707 B1 | * | 2/2001 | Gosselin | ................ B01D 53/34 423/245.3 |
| 8,747,524 B2 | * | 6/2014 | Chen | ...................... B01D 45/12 55/482 |
| 2013/0047853 A1 | | 2/2013 | Chen | |

FOREIGN PATENT DOCUMENTS

| | | | |
|---|---|---|---|
| CN | 111876546 | A | 11/2020 |
| CN | 111893234 | A | 11/2020 |
| CN | 111925101 | A | 11/2020 |
| CN | 111928650 | A | 11/2020 |
| CN | 111961503 | A | 11/2020 |
| CN | 111964436 | A | 11/2020 |
| CN | 111995224 | A | 11/2020 |
| CN | 112280921 | A | 1/2021 |
| CN | 213803655 | U | 7/2021 |
| JP | 06184561 | A | 7/1994 |
| JP | 2003075588 | A | 3/2003 |

OTHER PUBLICATIONS

International Search Report of PCT Patent Application No. PCT/CN2021/114517 issued on Nov. 19, 2021.

* cited by examiner

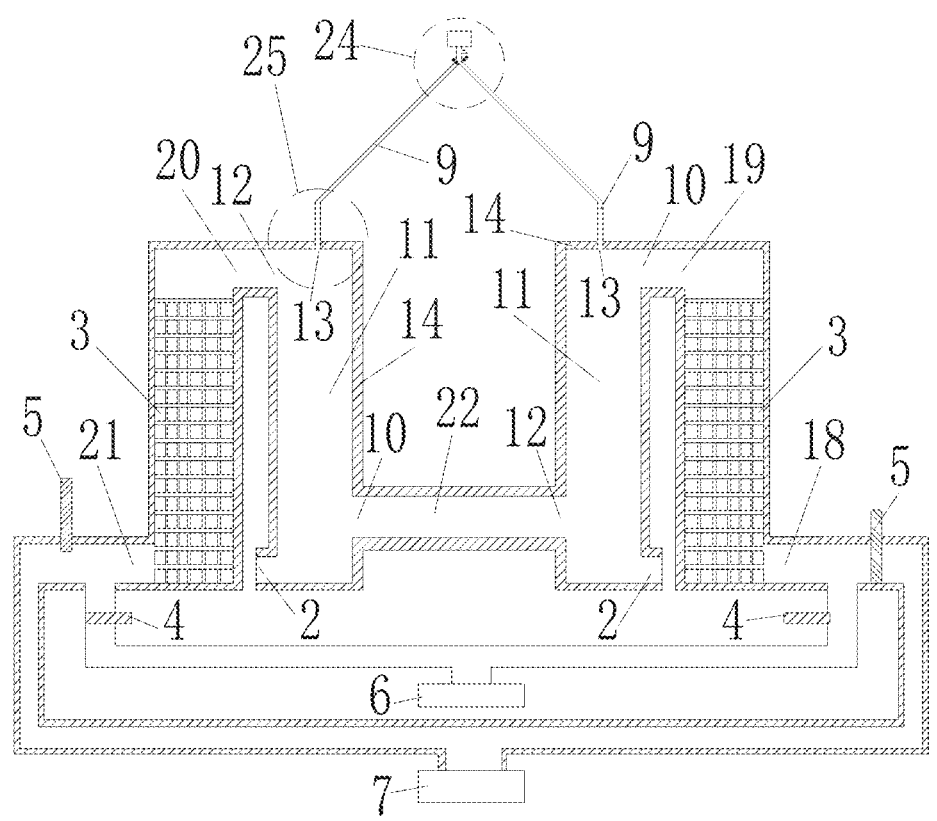
FIG. 1
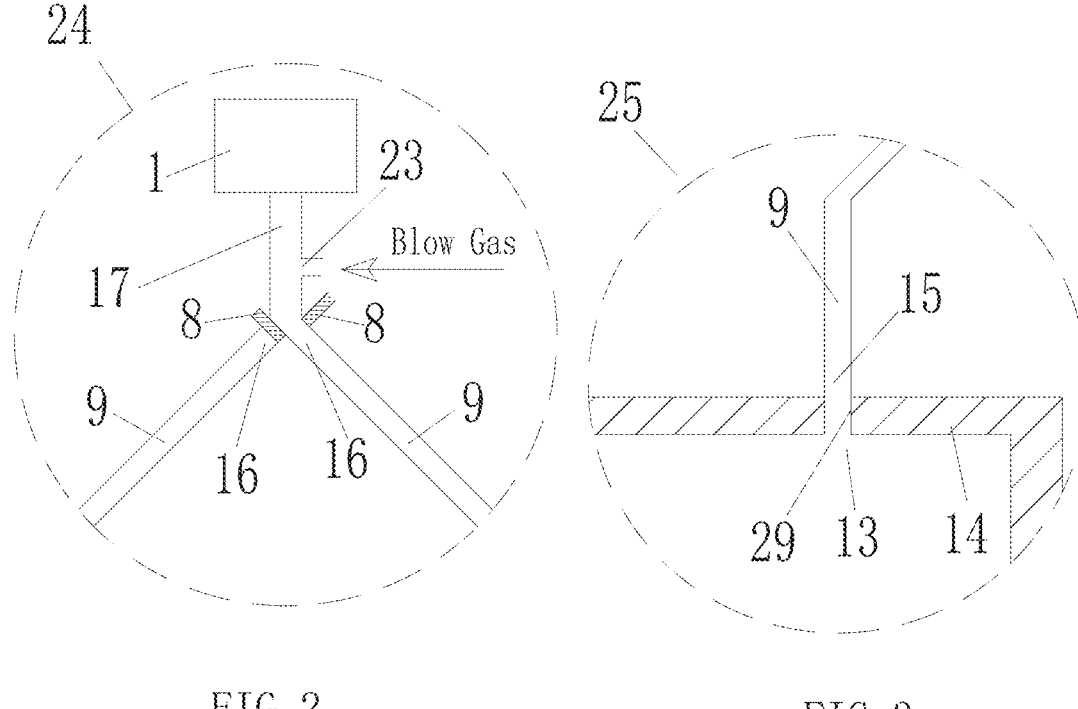
FIG. 2                                        FIG. 3

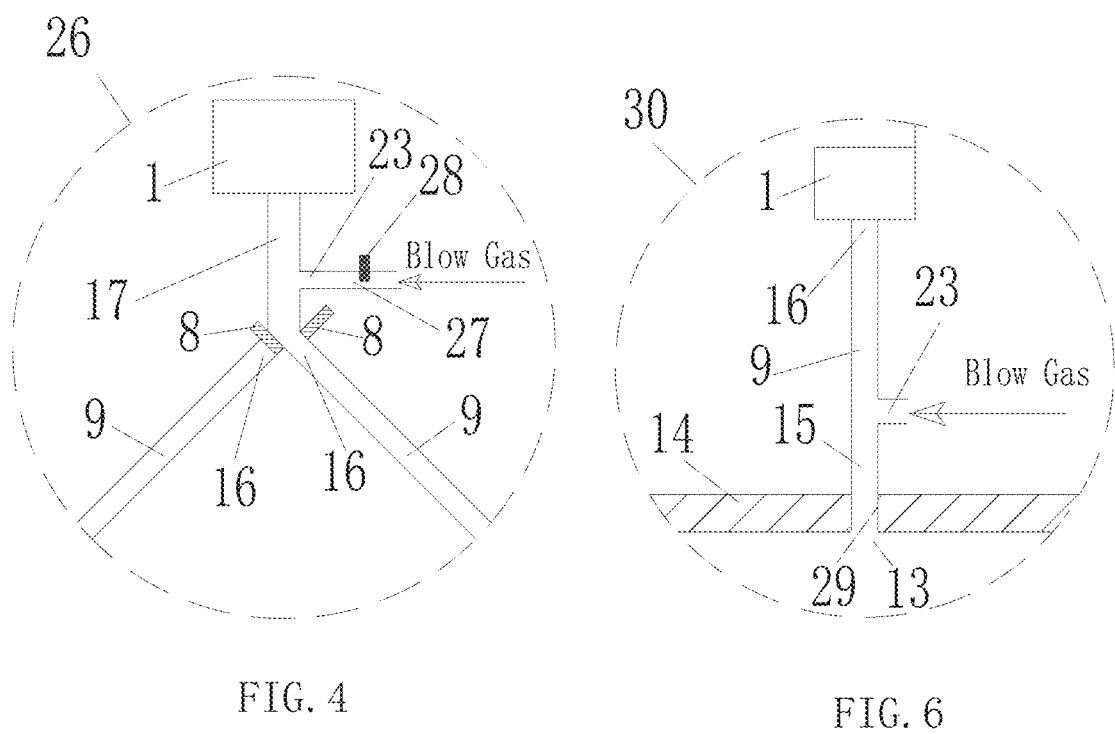
FIG. 4
FIG. 6
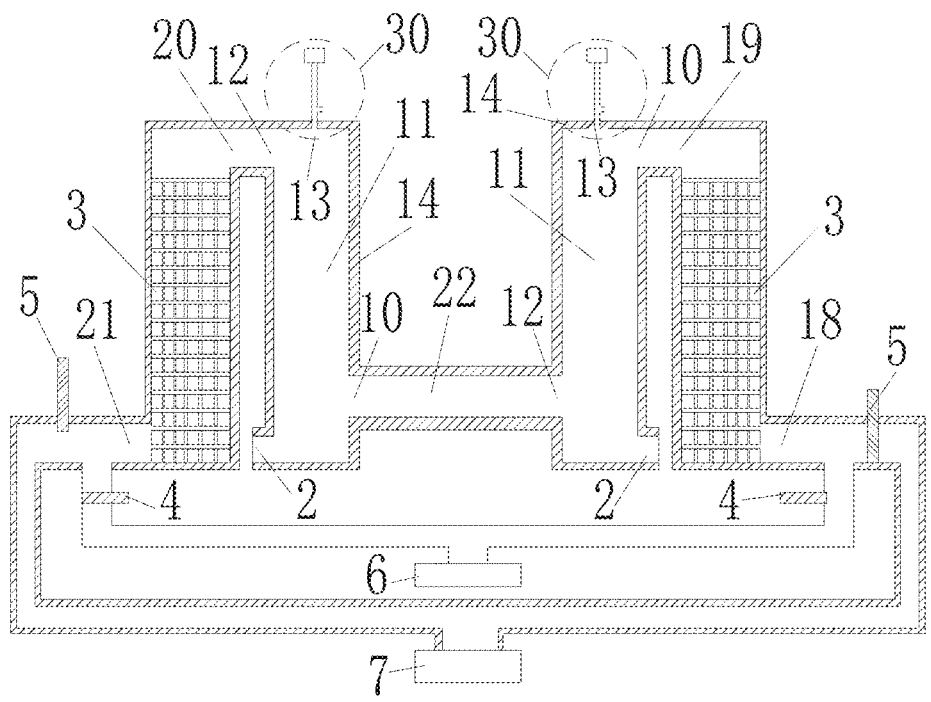
FIG. 5

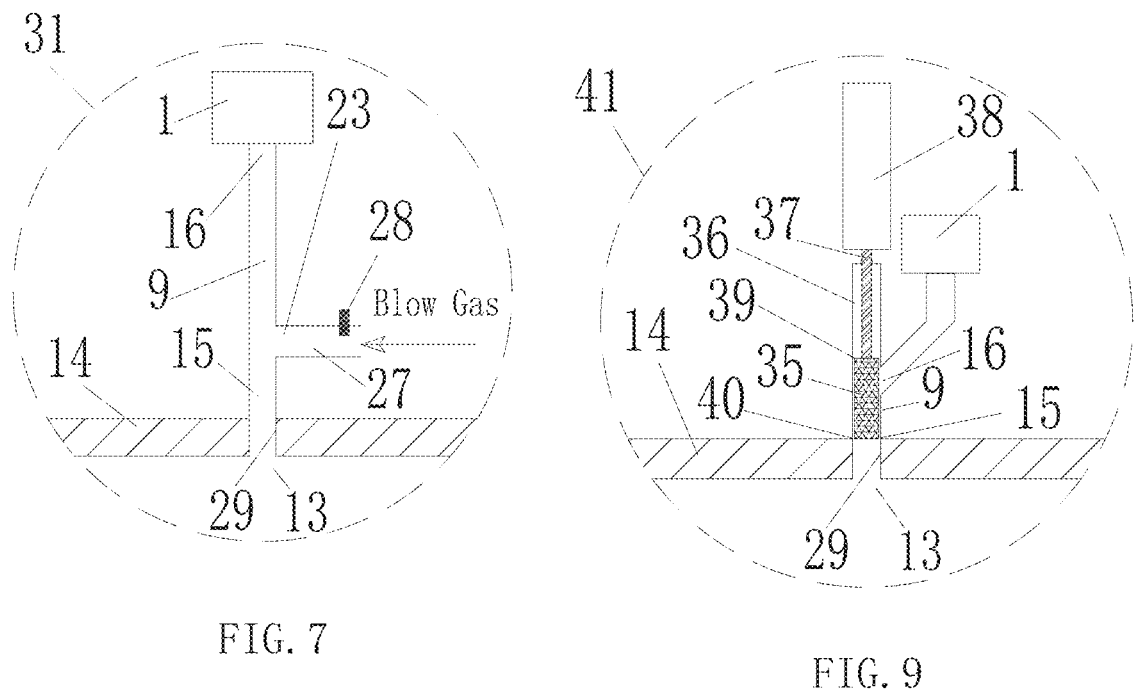
FIG. 7
FIG. 9
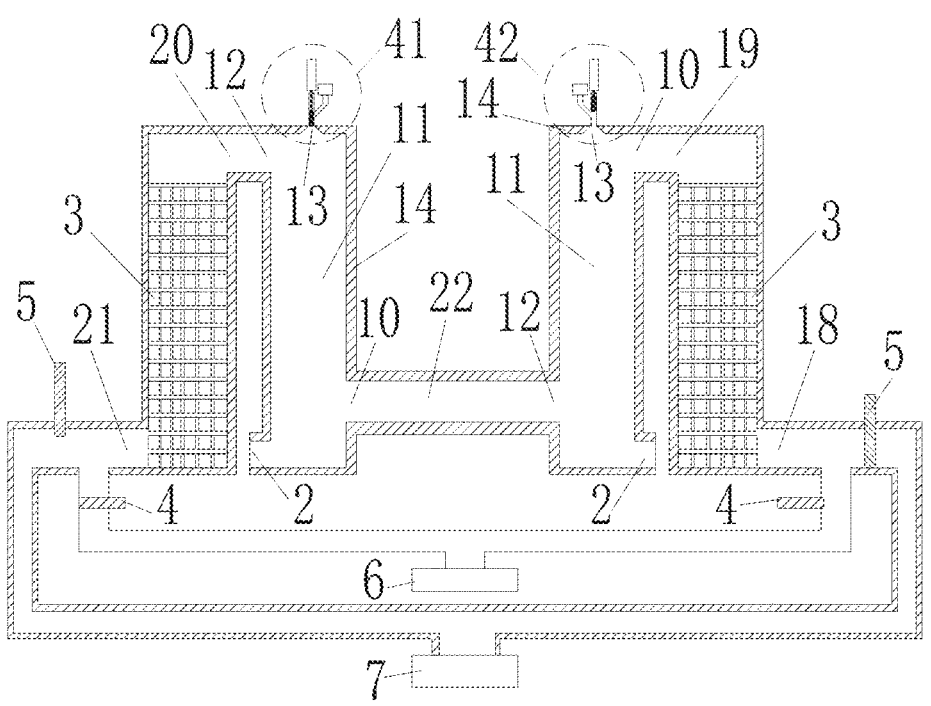
FIG. 8

POWDER-MATERIAL FLYING MELTING FURNACE HAVING DUAL REGENERATIVE CHAMBERS

CROSS REFERENCE TO RELATED APPLICATIONS

The present application is a Continuation application of PCT Application No. PCT/CN2021/114517 filed on Aug. 25, 2021, which claims the benefit of Chinese Patent Application No. 202010918492.8 filed on Aug. 26, 2020. All the above are hereby incorporated by reference in their entirety.

FIELD OF THE INVENTION

The present invention generally relates to the field of chemical industry and, more particularly, relates to powder-material flying melting furnace having dual regenerative chambers for melting powder raw material (or ash content of powder solid fuel) at high temperature under the flight state, which can be widely used in glass production, iron making, non-ferrous metal smelting, solid fuel gasification and so on.

BACKGROUND OF THE INVENTION

In the production of glass, iron, non-ferrous metal, and gasification of solid fuels, reactions need to be carried out in high-temperature furnaces. The powder raw material (or powder solid fuel) is dispersed in high temperature gas for high temperature reaction. Therefore, the heat and mass transfer speed is very fast, which can reduce energy consumption and production cost.

U.S. Pat. No. 8,747,524B2 discloses a furnace, in which powder raw materials such as glass, iron, non-ferrous metal and solid fuels can react at high temperatures in flight and the waste heat generated by the reaction can be recovered, The furnace requires two regenerative chambers to be used alternately to preheat the oxygen-containing gas and cool the high-temperature gas product. However, with two furnaces feeding in turn, the molten material often condenses and adheres on the inner wall of the two furnaces, blocking the feed inlet, thereby affecting the smooth feeding of raw materials. When the feed is not smooth, the feed quantity will reduce and the output will reduce, thereby affecting the stability of the working condition of the furnace. Serious blocking will lead to failure of feeding and the furnace needs to be stopped for exam and repair, which will cause great economic losses.

SUMMARY OF THE INVENTION

In order to solve the above problems, after careful study, the inventor of the present invention found that: the regenerative chambers used need to change direction once every period of time, and each direction change makes the direction of the gas flow in the melting furnace and the regenerative chamber into a direction opposite to the direction before the change. The two regenerative chambers can be used for preheating the oxygen gas and cooling the high-temperature gas products in turn respectively, and the two melting furnaces need to feed in turn. The melting furnace in communication with the regenerative chamber for preheating oxygen-containing gas is in a feeding state. In the hearth of the melting furnace, a fuel (in the case of gasification of a solid fuel, which is a powder solid fuel that is fed into the melting furnace from a feed inlet and is indicated in all the parentheses in the following paragraphs for gasification of a solid fuel) is rapidly mixed with a preheated gas containing oxygen, to reach a temperature above the melting temperature of powder raw material (or ash content of powdered solid fuel), usually more than 1450° C. required for the production of glass, iron-making and gasification of solid fuel, more than 1350° C. for flash copper smelting of copper concentrate.

The powder raw material (or powder solid fuel) dispersed in the high temperature gas is in the flight state. The heat and mass transfer efficiency is very high. The powder raw material (or ash content in the powder solid fuel) melts into the liquid melting dust rapidly. The liquid molten dust in the hearth brush the inner wall of the melting furnace along with the flow of high-temperature gas, most of the liquid molten dust will adhere to the furnace wall. Under the action of gravity, liquid molten dust flow down to the outlet near the bottom of the melting furnace. Although a small amount of molten dust is carried in the high-temperature gas output from the exhaust port of the melting furnace, it will then go into the second melting furnace, which is in a stop-feeding state. A small amount of molten dust carried by the high-temperature gas will adhere to the wall of the second melting furnace for purification and separation. The purified high-temperature gas will be imported into the regenerative chamber for cooling the high-temperature gas products to recover heat. As the powder raw material (or powder solid fuel) enters a melting furnace connected to a regenerative chamber for preheating oxygen-containing gases, a small amount of it will stick to the inner wall of the feed inlet of the melting furnace, the feed inlet of the melting furnace stops feeding. The high temperature gas enter the melting furnace from the other melting furnace will heat up the inner wall of the feed inlet of the furnace, the powder raw material adhered to the inner wall of the feed inlet (or ash content contained in the powder solid fuel) is heated, melted and bonded to the inner wall of the feed inlet. When the feed inlet resumes feeding after changing direction again, the new incoming powder raw material (or powder solid fuel) will adhere to the bonded melt on the inner wall of the feed inlet and reduce the temperature of the inner wall of the feed inlet, causing the bonded melt to cool and solidify. Therefore, in the case of repeated reversing, repeatedly bonding solidification will occur, the adhesive accumulate continuously, thereby resulting in blocking.

In order to solve the above problems, the present invention provides a first powder-material flying melting furnace having dual regenerative chambers, which includes two melting furnaces, raw material feeding equipment and oxygen-containing gas preheating system The oxygen-containing gas preheating system includes two regenerative chambers, two inlet reversing gates, two outlet reversing gates, an oxygen-containing gas input equipment and an exhaust equipment. One of the two regenerative chambers is used for preheating the oxygen-containing gas, and the other regenerative chamber is used for cooling the high-temperature gas product. The regenerative chamber for preheating the oxygen-containing gas includes a gas inlet and a preheat gas outlet. The regenerative chamber for cooling the high-temperature gas product has a high-temperature gas inlet and a cooling gas outlet.

According to one aspect of the present invention, the components included in the oxygen-containing gas preheating system are connected in a manner as following: the oxygen-containing gas input equipment is in communication with the gas inlet through an inlet reversing gate in an open state, and is in communication with the cooling gas outlet via an inlet reversing gate in a closed state. The exhaust equipment is in communication with the cooling gas outlet via an exhaust reversing gate in an open state, and is in communication with the gas inlet via an exhaust reversing gate in a closed state.

According to one aspect of the present invention, the melting furnace includes a feeding reversing gate, a raw material feeding pipeline, an air inlet, an air outlet, and a feed inlet, wherein the raw material feeding pipeline of the melting furnace includes an outlet end and an inlet end, the outlet end is in communication with the feed inlet of the melting furnace, and the inlet end is in communication with the feeding reversing gate of the melting furnace. The feeding reversing gates of the two melting furnaces are respectively in communication with the raw material feeding equipment through a common feed pipeline. The preheating gas outlet is in communication with an air inlet of a melting furnace, and the feeding reversing gate of the melting furnace is in an open state. The air outlet of the melting furnace is in communication with the air inlet of the other melting furnace via an airflow passage. The feeding reversing gate of the other melting furnace is in a closed state, and the air outlet of the other melting furnace is communicated with a high-temperature gas inlet. The common feed pipeline is provided with a blow gas inlet.

Compared with the prior art, the blow gas in the above technical solution plays a purging role on the inner wall of the feed inlet to prevent the powder raw material from adhering to the inner wall of the feed inlet, so that the molten material cannot be bonded and the blocking can be avoided.

The inventor of the present invention found that, under ideal conditions, the molten dust carried by the high-temperature gas is purified and separated by the hearth of the two melting furnaces, and the high-temperature gas will be very clean and then be put into the regenerative chambers for cooling the high-temperature gas products to recover the heat. In this case, using the above technical solution can solve the problem of the blocking of the feed inlet. However, sometimes, the molten dust cannot be separated completely, and there is a very small amount of molten dust difficult to be separated completely, this part of molten dust will fly into the feed inlet of the second furnace in the stop feeding state and stick to the inner wall of the inlet. After long time accumulation, the feed inlet may still be blocked.

In order to solve the above problems, the present invention provides a second powder-material flying melting furnace having dual regenerative chambers, which includes two melting furnaces and an oxygen-containing gas preheating system. The components of the oxygen-containing gas preheating system in second powder-material flying melting furnace having dual regenerative chambers are almost the same as those in first powder-material flying melting furnace having dual regenerative chambers, except that:

The melting furnace includes a raw material feeding equipment, an air inlet, an air outlet, a feed inlet and a raw material feeding pipeline, wherein the raw material feeding pipeline of the melting furnace includes an outlet end and an inlet end, the outlet end is in communication with the feed inlet of the melting furnace, the inlet end is in communication with the raw material feeding equipment. The preheating gas outlet is in communication with the air inlet of one melting furnace, the raw material feeding equipment of the melting furnace is in the start-up feeding state. The air outlet of the melting furnace is in communication with the air inlet of another melting furnace through a gasflow passage, and the raw material feeding equipment of the other melting furnace is in the stop feeding state, an air outlet of the other melting furnace is in communication with a high-temperature gas inlet. A blow gas inlet is arranged on the raw material feeding pipeline.

Since a blow gas inlet is arranged on the raw material feeding pipelines of the two melting furnaces, when the raw material feeding equipment of the other melting furnace is in a stop feed state, a blow gas is also fed into the melting furnace from the feed inlet of the melting furnace, preventing the high-temperature melting dust which cannot be completely purified by the melting furnace from flying into the feed inlet, thereby preventing the high-temperature melting dust from sticking on the inner wall of the feed inlet and causing blocking, and cooling the inner wall of the feed inlet, avoid inner wall of the feed inlet heating up to the melting temperature of powder raw material (or ash contained in powdered solid fuel).

In order to solve the above problems, the present invention provides a third powder-material flying melting furnace having dual regenerative chambers, which includes two melting furnaces and an oxygen-containing gas preheating system. The components of the oxygen-containing gas preheating system in third powder-material flying melting furnace having dual regenerative chambers are almost the same as those in first fourth powder-material flying melting furnace having dual regenerative chambers, except that:

The melting furnace includes a raw material feeding equipment, an air inlet, an air outlet, a feed inlet and a raw material feeding pipeline. The raw material feeding pipeline of the melting furnace includes an outlet end and an inlet end, the outlet end is in communication with the feed inlet of the melting furnace, and the inlet end is in communication with the raw material feeding equipment of the melting furnace. The preheating gas outlet is in communication with the air inlet of the melting furnace, and the raw material feeding equipment of the melting furnace is in the start-up feeding state. The air outlet of the melting furnace is in communication with the air inlet of another melting furnace through a gasflow passage, and the raw material feeding equipment of the other melting furnace is in a stop feeding state, an air outlet of the other melting furnace is communication with a high-temperature gas inlet. The feed inlet is provided with a forced feeding equipment which pushes the powdery raw material into the feed inlet via a mechanical thrust from the raw material feeding pipeline.

In order to solve the above problems, the present invention provides a fourth powder-material flying melting furnace having dual regenerative chambers, which includes two melting furnaces and an oxygen-containing gas preheating system. The components of the oxygen-containing gas preheating system in fourth powder-material flying melting furnace having dual regenerative chambers are almost the same as those in first powder-material flying melting furnace having dual regenerative chambers, except that:

The melting furnace includes a raw material feeding equipment, a raw material feeding pipeline, an air inlet, an air outlet and a feed inlet. The raw material feeding pipeline is a movable feeding pipeline, and the outlet end of the movable feeding pipeline is flexibly connected to the feeding inlet. The preheating gas outlet is in communication with an air inlet of one melting furnace, and the feed inlet of the melting furnace is in communication with a raw material feeding equipment through the movable feeding pipeline. The air outlet of the melting furnace is in communication with the air inlet of the other melting furnace through a gas flow passage, and the air outlet of the other melting furnace is in communication with the high-temperature gas inlet. The feed inlet of the other melting furnace and the outlet end of the movable feeding pipe are in a disconnected connection state.

BRIEF DESCRIPTION OF THE DRAWINGS

The powder-material flying melting furnace having dual regenerative chambers and technical effects of the present invention will be described in detail in view of the drawings and embodiments.

FIG. 1 is a structure schematic diagram of a powder-material flying melting furnace having dual regenerative chambers according to a first embodiment of the present invention;

FIG. 2 is an enlarged view of the dotted circle part 24 in FIG. 1;

FIG. 3 is an enlarged view of the dotted circle part 25 in FIG. 1;

FIG. 4 is a partial structure schematic diagram of the powder-material flying melting furnace having dual regenerative chambers according to a second embodiment of the present invention;

FIG. 5 is a structure schematic diagram of the powder-material flying melting furnace having dual regenerative chambers according to a third embodiment of the present invention;

FIG. 6 is an enlarged view of the dotted circle part 30 in FIG. 5;

FIG. 7 is a partial structure schematic diagram of the powder-material flying melting furnace having dual regenerative chambers according to a fourth embodiment of the present invention;

FIG. 8 is a partial structure schematic diagram of the powder-material flying melting furnace having dual regenerative chambers according to a fifth embodiment of the present invention;

FIG. 9 is an enlarged view of the dotted circle part 41 in FIG. 8;

DETAILED DESCRIPTION OF THE INVENTION

First Embodiment of the Present Invention

Figure 10:
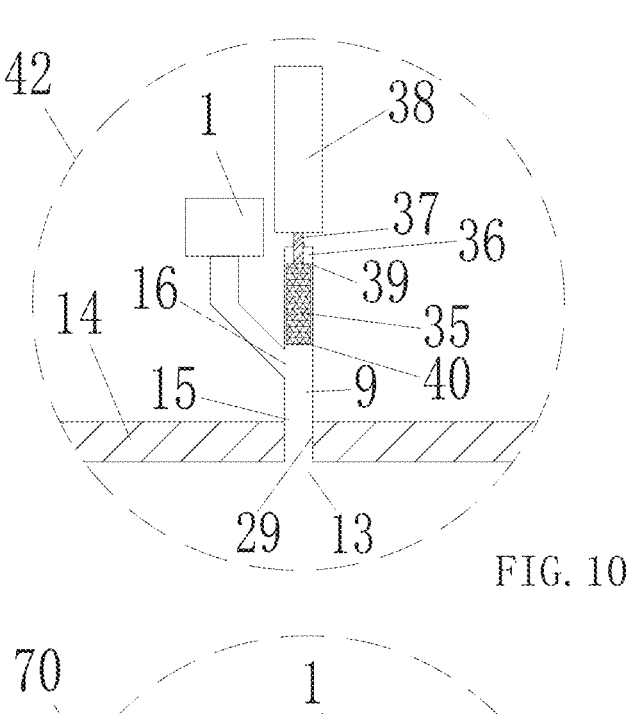
FIG. 10 is an enlarged view of the dotted circle 42 in FIG. 8.

Referring to FIGS. 1 to 3, the powder-material flying melting furnace having dual regenerative chambers of the present invention includes two furnaces, a raw material feeding equipment 1 and an oxygen-containing gas preheating system. The oxygen-containing gas preheating system includes two regenerative chambers 3, two inlet reversing gates 4, two exhaust reversing gates 5, an oxygen-containing gas input equipment 6 and an exhaust device 7. One of the two regenerative chambers 3 is used for preheating the oxygen-containing gas and the other regenerative chamber 3 is used for cooling the high-temperature gas product. The regenerative chamber 3 for preheating the oxygen-containing gas has a gas inlet 18 and a preheating gas outlet 19. The regenerative chamber 3 for cooling the high-temperature gas product has a high-temperature gas inlet 20 and a cooling gas outlet 21.

The components of the oxygen-containing gas preheating system are connected in the following manner the oxygen-containing gas input equipment 6 is communicated with the gas inlet 18 via an inlet reversing gate 4 in an opening state (the inlet reversing gate 4 on the right side of FIG. 1), and is communicated with the; cooling gas outlet 21 via the other inlet reversing gate 4 (the inlet reversing gate 4 on the left side of FIG. 1) in a closed state. The exhaust equipment 7 is communicated with the cooling gas outlet 21 via an exhaust reversing gate 5 in an opening state (the exhaust reversing gate 5 on the left of FIG. 1), and is communicated with the gas inlet 18 via the other exhaust reversing gate 5 in a closed state (the exhaust reversing gate 5 on the right side of FIG. 1).

Referring particularly to FIGS. 2 and 3, the furnace includes a feed reversing gate 8, a raw material feed pipeline 9, an air inlet 10, an air outlet 12, and a feed inlet 13. The raw material feed pipeline 9 of the furnace includes an outlet end 15 and an inlet end 16, wherein the outlet end 15 is communicated with the inlet end 13 of the furnace, and the inlet end 16 is communicated with the feed reversing gate 8 of the furnace. The feed reversing gates 8 of the two furnaces are communicated with the raw material feeding equipment 1 via a common feed pipeline 17, respectively. The preheat gas outlet 19 is communicated with the air inlet 10 of one furnace, the feeding reversing gate 8 of the furnace (the feeding reversing gate 8 on the right of FIG. 2) is in an open state, and the air outlet 12 of the furnace is communicated with the air inlet 10 of the other furnace via an airflow passage 22. The feed reversing gate 8 of the other furnace (the feed reversing gate 8 on the left of FIG. 2) is in a closed state, and the air outlet 12 of the other furnace is communicated with the high temperature gas inlet 20. A blow gas inlet 23 is arranged on the common feed pipeline 17.

The inlet reversing gate 4 and the exhaust reversing gate 5 are used for the reverse operation, where one inlet reversing gate 4 and one exhaust reversing gate 5 are in an open state, the other inlet reversing gate 4 and the other exhaust reversing gate 5 are in a closed state. At regular intervals, the inlet reversing gate 4 and the exhaust reversing gate 5 reverse once. The inlet reversing gate 4 and the exhaust reversing gate 5, which are in the open state before the reverse, are in the closed state after the reverse. The inlet reversing gates 4 and exhaust reversing gates 5 in the closed state before reversing are in the open state after reversing. The feeding reversing gate 8 in the open state before reversing is in the closed state after reversing, the feeding reversing gate 8 in the closed state before the reversing is in an open state after the reversing. The reverse operation is generally carried out every 10-60 minutes.

Compared with the prior art, in the first embodiment of the present invention, because a blow gas inlet 23 is arranged on a common feed pipeline 17, the blow gas will be mixed with the powder raw material input from the raw material feeding equipment 1 and further fed to the hearth 11 via the feeding reversing gate 8 in an open state and the raw material feeding pipeline 9, the feed inlet 13 in communication with the feeding reversing gate 8 in turn. The blow gas plays a purging role on the inner wall 29 of the feed inlet 13 to prevent the powdery raw material from adhering to the inner wall 29 of the feed inlet 13. After the feeding reversing gate 8 in communication with the raw material feeding pipeline 9 is reversed and closed, the raw material feeding pipeline 9 has no raw material and blow gas feed into the furnace 11 (as shown in FIG. 3), the high-temperature gas in the hearth 11 makes the temperature at inner wall 29 of the feed inlet 13 above the melting temperature of the powder raw material (or ash content of the powdered solid fuel), but because of the purging action, no powder raw material is adhered to the inner wall 29 of the feed inlet 13, and no molten material is formed to avoid blockage.

Second Embodiment of the Present Invention

Referring to FIGS. 1 and 4, in a second embodiment of the present invention, the region represented by the dotted circle 24 in FIG. 1 is replaced by the region represented by the dotted circle 26 in FIG. 4, to form a powder-material flying melting furnace having dual regenerative chambers. The structure of the second embodiment is basically the same as that of the first embodiment. The difference between the first embodiment and the second embodiment lies that, in the second embodiment of the present invention, a blow gas inlet 23 arranged on a common feed pipeline 17 is in communication with a blow gas input line 27, and a valve 28 is arranged on the blow gas input line 27.

Third Embodiment of the Present Invention

Referring to FIGS. 5 and 6, the powder-material flying melting furnace having dual regenerative chambers according to the third embodiment of the present invention includes two furnaces and an oxygen-containing gas preheating system identical to the first embodiment of the present invention. The difference between the first embodiment and the third embodiment of the present invention lies in that:

In the third embodiment of the present invention, the furnace includes a raw material feeding equipment 1, an air inlet 10, an air outlet 12, a feed inlet 13 and a raw material feeding pipeline 9. The raw material feeding pipeline 9 of the furnace includes an outlet end 15 and an inlet end 16. The outlet end 15 is in communication with the feed inlet 13. The inlet end 16 is communicated with the raw material feeding equipment 1 of the furnace The preheat gas outlet 19 is in communication with an air inlet 10 of a furnace, and the raw material feeding equipment 1 of the furnace is in a start-up feeding state, the air outlet 12 of the furnace is in communication with the air inlet 10 of another furnace via the airflow passage 22. The raw material feeding equipment 1 of the other furnace is in a stopped feeding state, the air outlet 12 of the other furnace is in communication with a high temperature gas inlet 20. The raw material feeding pipeline 9 is provided with a blow gas inlet 23.

Fourth Embodiment of the Present Invention

Referring to FIGS. 5 and 7, in a fourth embodiment of the present invention, the region represented by the dotted circle 30 in FIG. 5 is replaced by the region represented by the dotted circle 31 in FIG. 7, to form a powder-material flying melting furnace having dual regenerative chambers. The structure of the fourth embodiment of the present invention is almost the same as that of the third embodiment of the present invention. The difference between the third embodiment and the fourth embodiment of the present invention lies in that: a blow gas input line 27 is in communication with the blow gas inlet and a valve 28 is arranged on the blow gas input line 27.

The valve 28 mounted on the blow gas input line 27 can be used to open or close the blow air and adjust the blow air dosage to a more appropriate dosage, to avoid the inner wall 29 of the feed inlet 13 cannot be swept clean when the dosage is too low, and to avoid the waste of the blow air when the blow air dosage is too high. If the blow gas is not preheated, the temperature of the blow gas is relatively low, and the temperature of the furnace can be lowered if the blow gas dosage is too high.

The stopped feed inlet 13 does not require a large airflow speed to prevent molten dust from flying in, and the blow gas volume can be reduced by the valve 28. A feeding feed inlet 13 does not need to be continuously fed with blow air, only needs to open valve 28 before reversing to clean the powder adhered on the inner wall 29 of the feeding inlet 13, generally closing the valve 28 after blowing 3-5 seconds. For the second embodiment of the present invention, the valve 28 is also required to be opened after reversing, and the feed inlet 13, which is about to start feeding, is purged, so that the inner wall 29 is cooled below the melting temperature of the powdered raw material (or ash content of the powdered solid fuel), and then the raw material feeding equipment 1 is started to feed, in order to prevent the new powder material from melt bonding on the inner wall 29 in the state of high temperature. Generally, the valve 28 can be closed after 5-10 seconds blowing. In order to reduce the amount of blow gas used in the production of glass using the above-mentioned technical solution, the operator has been using the above-mentioned operation and has not continuously input the blow gas to the feeding feed inlet 13. However, test finds that when the valve 28 cannot be closed due to failure, the blow gas can be continuously input to the feeding fee inlet 13. In this case, two days of production is carried out. In the production statistics report, it is found that in the two days, the pass rate of the glass products than the increased by 2.7%. After two months of repeated comparative experiments, it was found that, compared with the above operation manner, due to the continuous input of blow gas into the feeding raw material feeding pipeline 9, the pass rate of the glass products can be increased by 3.6%.

According to experimental comparison, in comparison with the above-mentioned operation manner, when the technical solution of the above-mentioned embodiment is used for iron-making, copper-making or solid fuel gasification, if a blow gas is continuously inputted into the feed inlet 13, the consumption of the raw materials can be reduced as following.

In iron-making, the amount of iron-making raw materials consumed per ton of iron produced can be reduced by 3.2%;

In copper-making, the amount of copper-making raw material consumed per ton of copper produced can be reduced by 2.7%;

In solid fuel gasification, the amount of solid fuel consumed per cubic meter of gas produced can be reduced by 2.6%.

After careful study, it was found that, because of the viscous nature of the powder raw material, if no blow gas is inputted into the feed inlet 13, some powder agglomeration exists in the powder raw material inputted into the furnace from the feed inlet 13. When the lumpy powder enters the furnace, some of the lumpy powder cannot be dispersed by the high temperature airflow in the furnace in time, and the surface layer of the powder pellets rapidly melts, forming powder pellets wrapped by a layer of molten liquid. It is more difficult to blow away the powder pellets wrapped in the molten liquid in the gas flow in the furnace. The reaction rate of mass transfer and heat transfer between the powder inside the powder pellets and the high-temperature gas flow outside is very slow, resulting in the following disadvantages:

In the production of glass, the powder raw material is usually a powder glass raw material. The powder in the glass raw material powder pellet wrapped by the molten liquid cannot melt fully in time, and becomes a kind of pellets that cannot melt fully discharged from the melting furnace. In the finished products such as flat glass or bottle glass, the pellets that cannot melt fully form inclusion defects in the glass product and lead to an unqualified product.

In iron-making, the powder raw material includes an iron ore powder, a powder flux mineral (usually presented as limestone). The high-temperature gas in hearth 11 is a high-temperature reductive gas containing CO and $H_2$. The powder raw material is fully dispersed in the high-temperature reductive gas, and the heat and mass transfer efficiency is very high. The powder raw material will rapidly melt into a liquid state and reduce the precipitated liquid iron and the slag in melted state, which will be discharged from the drain outlet 2. However, the reaction rate of the iron ore powder in the powder pellet wrapped by the molten liquid and the high-temperature reductive gas outside is very slow. The iron contained in the powder pellet cannot be fully reduced and extracted in time and becomes a slag to be discharged out of furnace;

In copper-making, the powder raw material includes copper sulfide concentrate powder and a powder flux. When the powder raw material is fully dispersed in the high temperature gas in the hearth, it only takes 2-3 seconds for the reaction of oxidation desulphurization, melting and slagging to form copper matte and slag, which can be discharged from the drain outlet 2. However, the reaction rate of the copper sulphide concentrate in the powder pellets wrapped by molten liquid and the outside high temperature gas is very slow, and there is no enough reaction time to form copper matte is formed before the copper sulphide concentrate becoming the slag and discharged from the drain outlet 2;

In solid fuel gasification, the powder raw material (or powder solid fuel) typically includes pulverized coal and powder biomass fuel. The ash contained in the surface layer of the undispersed solid fuel powder pellets rapidly melts in a high-temperature hearth, forming a powder pellet wrapped by a layer of molten liquid, the solid fuel in the powder pellet cannot be fully gasified into high-temperature gas in time before being discharged from the furnace along with the melted ash.

If a blow gas is continuously fed into the feed inlet 13, when the blow gas enters the raw material feeding pipeline 9, it will impact and blow away the powder pellets, so that the powder material is fully dispersed in the high-temperature gas flow in the furnace. The fine powder particles are in full contact with the high temperature airflow, and the heat and mass transfer speed is very fast. The above-mentioned production of glass, iron, copper or solid fuel gasification, can obtain the following more adequate reaction respectively:

During the production of glass, the fine glass powder particles can fully contact with the high-temperature air flow and can fully carry out the melting reaction to form qualified glass liquid, thereby avoiding the inclusion defects caused by the agglomeration of the powder and improving the product pass rate;

During iron-making, the fine iron-making powder particles are in full contact with the high-temperature reductive air flow, and the reaction speed is very fast, to fully reduce and extract the iron in the raw material and avoid the raw material waste caused by powder agglomeration;

During copper-making, the fine copper powder particles are in full contact with the high-temperature air flow, and the reaction speed is very fast. The copper sulfide concentrate can carry out the reaction of oxidation desulphurization, melting and slagging, so that the copper contained in the copper sulphide concentrate can be fully converted into copper matte, to prevent it from becoming slag and causing waste of raw materials;

During solid fuel gasification, the fine powder solid fuel particles are in full contact with the high temperature oxygen-containing gas, the reaction speed is very fast, the high temperature gas containing CO and $H_2$ can be fully gasified, and the fuel waste caused by the agglomeration of powdered solid fuel is avoided.

In view of the foregoing, by continuously inputting blow gas into the feeding feed inlet 13, the powder raw material can be fully dispersed in the high-temperature gas flow in the furnace, and the high-temperature reaction is more sufficient, thereby obtaining unexpected technical effects. Therefore, preferably, the present invention continuously inputs a blow gas into a feed inlet 13 being fed.

In the above embodiments, the blow gas can be input by connecting a blow gas input device on a blow gas inlet 23, and the blow gas can use oxygen-containing gas or nitrogen gas, wherein the oxygen-containing gas includes air or oxygen-enriched air.

Using air as blow gas is relatively easy to obtain by connecting a blower to the blow gas inlet 23 or using a compressed air input. If the furnace pressure in hearth 11 is controlled to an appropriate negative pressure value (equivalent to the pressure in hearth 11 being less than the external pressure and having an appropriate pressure difference), a hole defined in the raw material feeding pipeline 9 or common feed pipeline 17 can be used as a blow air input equipment drawing in outside air and acting as blow air.

When the third or fourth embodiment is used for iron-making, an oxygen-containing gas is used as the blow gas, the high-temperature reductive waste gas can also be mixed with the blow gas before being fed into the regenerative chamber 3 for cooling the high-temperature gas products. In the fourth embodiment, only the valve 28 on the blow gas input line 27 needs to be adjusted to an appropriate oxygen-containing gas input quantity to enable the high-temperature reductive exhaust gas to burn fully, therefore, the chemical energy of the high-temperature reductive waste gas can be fully utilized.

Fifth Embodiment of the Present Invention

Referring to FIGS. 8 to 10, the fifth embodiment of the powder-material flying melting furnace having dual regenerative chambers of the present invention includes two furnaces and an oxygen-containing gas preheating system identical to the first embodiment of the present invention. The difference between the first and fifth embodiment of the present invention lies in that:

The furnace includes a raw material feeding equipment 1, an air inlet 10, an air outlet 12, a feed inlet 13 and a raw material feeding pipeline 9. The raw material feeding pipeline 9 of the furnace includes an outlet end 15 and an inlet end 16, the outlet end 15 is in communication with the feed inlet 13 of the furnace, and the inlet end 16 is in communication with the raw material feeding equipment 1 of the furnace. The preheat gas outlet 19 is in communication with the air inlet 10 of a furnace, the raw material feeding equipment 1 of the furnace is in the start-up feeding state, the air outlet 12 of the furnace is in communication with the air inlet 10 of another furnace through the airflow passage 22, and the raw material feeding equipment 1 of the other furnace is in the stop feeding state, the air outlet 12 of the other furnace is in communication with the high-temperature gas inlet 20. A forced feeding equipment is arranged on the feed Inlet 13.

The forced feeding equipment includes a push rod 35, a rod receiving chamber 36, a piston 37, and a driving mechanism 38 for reciprocating movement of the piston 37. The rod receiving chamber 36 is in communication with an inlet end 16 of the raw material feeding pipeline 9. The outer diameter of the push rod 35 corresponds to the inner diameter of the raw material feeding pipeline 9. The push rod 35 includes a tail end 39 and a top end 40. The tail end 39 of the push rod 35 connects the piston 37. The top end 40 of the push rod 35 is pushed by the piston 37 to the retraction end point position of the reciprocating motion and retreats into the rod receiving chamber 36 (shown in FIG. 10), and reaches the feed inlet 13 when the top end 40 reaching at the position of the thrust end of the reciprocating motion (as shown in FIG. 9). The tail end 39 of the push rod 35 is pushed by the piston 37 to be received in the rod receiving chamber 36 when the tail end arriving at the thrust end of the reciprocating motion.

The above-mentioned forced feeding equipment is an equipment for pushing the powdery raw material from the raw material feeding pipeline 9 into the feed inlet 13 by mechanical driving force. The push rod 35 can carry out continuous reciprocating movement, forcing the powdery raw material from the inlet end 16 into the raw material feeding pipeline 9 into the feed inlet 13.

When the inner wall 29 of the feed inlet 13 has molten material, the molten material will be condensed and adhere to the inner wall 29. After the condensation, the bond strength is very high and the condensed material is difficult to remove, which may cause clogging due to continuous accumulation. The push rod 35 may continuously and forcibly push the powdery raw material and the molten material together from the feed inlet 13 into the hearth 11, and may promptly remove a small amount of the molten material adhered to the inner wall 29, so as to avoid the problem that the molten matter is difficult to remove and cause clogging after condensing and bonding.

Sixth Embodiment of the Present Invention

Figure 11:
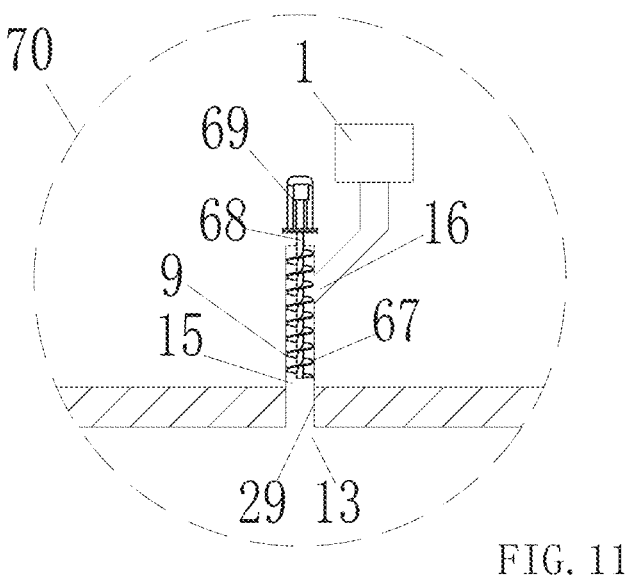
FIG. 11 is a partial structure schematic diagram of the powder-material flying melting furnace having dual regenerative chambers according to a sixth embodiment of the present invention.

Referring to FIGS. 5 and 11, the area indicated by the dotted circle 30 in FIG. 5 is replaced by the area indicated by the dotted circle 70 in FIG. 11, to form a powder-material flying melting furnace having dual regenerative chambers. The sixth embodiment is almost the same as the fifth embodiment, and the only difference between the sixth embodiment and the fifth embodiment lies in that the forced feeding equipment in the sixth embodiment is different from the forced feeding equipment in the fifth embodiment. The forced feeding device of the sixth embodiment includes a spring-shaped helical blade 67 and a mechanically driven rotating shaft 68. The helical blade 67 is located in the raw material feeding pipeline 9, the rotating shaft 68 is positioned on the center line of the helical blade 67, and the rotating shaft 68 is fixedly connected with the helical blade 67.

The rotating shaft 68 is driven by a motor 69, and the rotating shaft 68 is connected with a motor 69.

The above-mentioned forced feeding equipment is also an equipment for pushing the powdery raw material from the raw material feed pipeline 9 into the feed inlet 13 by mechanical drive. The rotation direction of the rotating shaft 68 causes the helical blade 67 to push the powdery raw material towards the feed inlet 13. When there is molten material on the inner wall 29 of the feed inlet 13, the powder raw material and the molten material are forced into the hearth 11 by the helical blade 67 to avoid blockage.

Seventh Embodiment of the Present Invention

Figure 12:
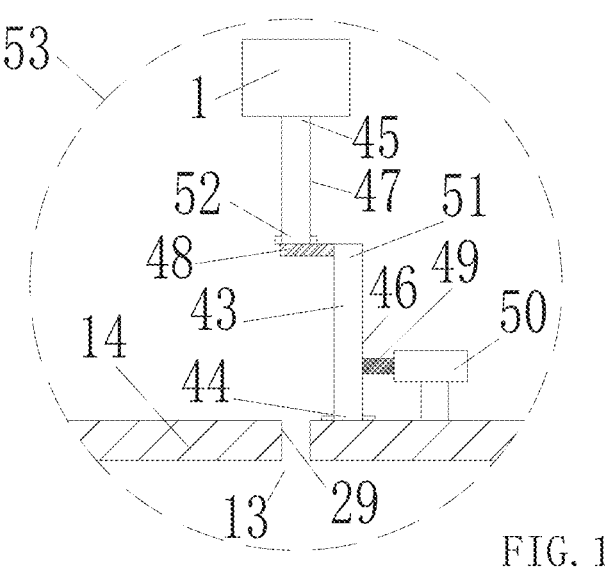
FIGS. 12 and 13 are partial structure schematic diagrams of the powder-material flying melting furnace having dual regenerative chambers according to a seventh embodiment of the present invention.
Figure 13:
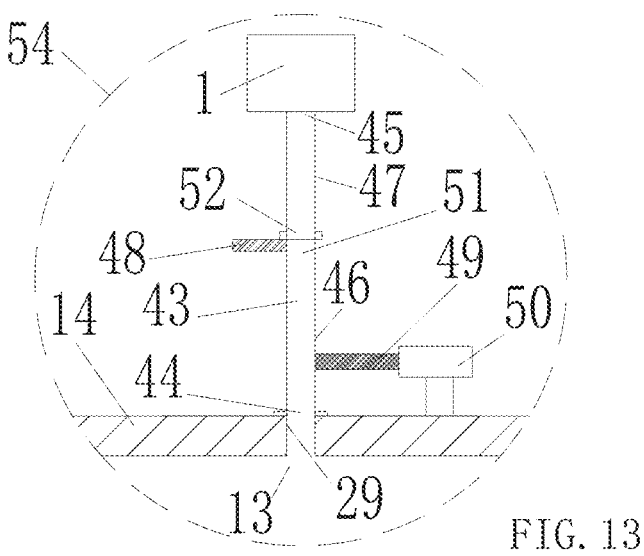

Referring to FIGS. 8, 12 and 13, the areas shown by dotted circles 41 and 42 in FIG. 8 are replaced by the areas shown by dotted circles 53 and 54 in FIGS. 12 and 13, respectively, to form a powder-material flying melting furnace having dual regenerative chambers including two furnaces and an oxygen gas preheating system in the same manner as the first embodiment. The difference between the first embodiment and the seventh embodiment lies in that:

The furnace includes a raw material feeding equipment 1, a raw material feeding pipeline, an air inlet 10, an air outlet 12 and a feed inlet 13, wherein the raw material feeding pipeline is moveable feeding pipeline 43. The outlet end 44 of the movable feeding pipeline 43 is movably connected with the feed inlet 13. The preheat gas outlet 19 is in communication with the air inlet 10 of a furnace, a feed inlet 13 of the furnace is in communication with a raw material feeding equipment 1 via a movable feeding pipeline 43, and an air outlet 12 of the furnace is in communication with an airflow passage 22 and an air inlet 10 of another furnace. An air outlet 12 of the other furnace is in communication with a high-temperature gas inlet 20. The feed inlet 13 of the other furnace is disconnected from the outlet end 44 of the movable feeding pipeline 43.

The movable feeding pipeline 43 includes a fixed pipeline 47, a movable pipeline 46, a gate plate 48, a piston 49 and a driving mechanism 50 for reciprocating movement of the piston 49. The fixed pipeline 47 includes an inlet end 45 and an outlet 52. The inlet end 45 is in communication with a raw material feeding equipment 1. The movable pipeline 46 includes an inlet 51, an outlet end 44, and the gate plate 48 is fixedly connected to the outside of the inlet 51 of the movable pipeline 46. The piston 49 is connected with the movable pipeline 46. When the movable pipeline 46 is pushed to the position of the propulsion end point of the reciprocating movement by the piston 49, the outlet end 44 is in communication with the feed inlet 13 (as shown in FIG. 13), and the inlet 51 is in communication with the outlet 52. When the movable pipeline 46 is driven by the piston 49 to the retraction end point position of the reciprocating motion, the outlet end 44 is disconnected from the feed inlet 13 (as shown in FIG. 12), the inlet 51 is disconnected from the outlet 52, and the gate plate 48 covers the outlet 52.

It is difficult to know the specific degree of blocking if the feed inlet 13 is connected with the raw material feeding pipeline 9. In this embodiment, the operator may disconnect the stopped feed inlet 13 from the movable feeding tube 43 at any time, to see if there is a molten condensation bond on the inner wall 29 of the feed inlet 13, to facilitate the operation of workers with electric drill, brush or grinding wheel and other conventional tools to clean the inner wall 29 of the bonded material, and avoid blockage caused by more and more of the bonded material. After disconnecting, the feed inlet 13 is in communication with the outside, which will cause the heat loss of the furnace and the high-temperature gas leakage. When the pressure in the furnace is greater than the outside pressure, the high temperature gas in the furnace will leak. Therefore, when disconnecting, the furnace pressure should be adjusted to slightly lower than the external pressure.

Eighth Embodiment of the Present Invention

Figure 14:
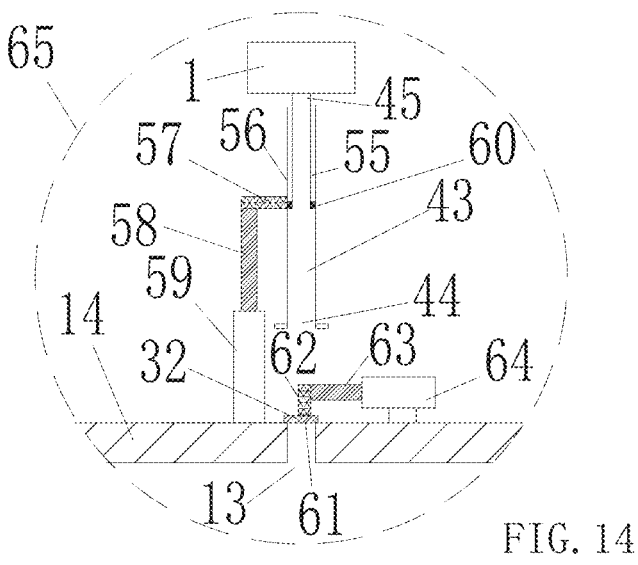
FIGS. 14 and 15 are partial structure schematic diagrams of the powder-material flying melting furnace having dual regenerative chambers according to an eighth embodiment of the present invention.
Figure 15:
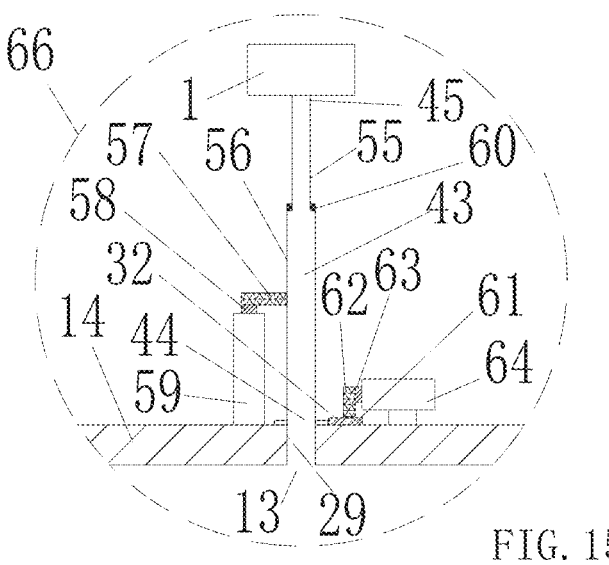

FIGS. 14 and 15 schematically represent a movable feeding pipeline and a gate. The region represented by the dotted circles 41 and 42 in 8 are replaced by the regions represented by the dotted circles 65 and 66 in FIGS. 14 and 15 respectively, to form a powder-material flying melting furnace having dual regenerative chambers. The eighth embodiment of the present invention has almost the same structure as that of the seventh embodiment of the present invention. The difference between the eighth and seventh embodiment of the present invention lies in that the feed inlet 13 is provided with a gate 32 and the movable feeding pipeline 43 has a different structure from that of the seventh embodiment.

Referring to FIGS. 14 and 15, the movable feeding pipeline 43 includes an inner pipeline 55, an outer pipeline 56, an outlet end 44, an inlet end 45, a transverse arm 57, a piston 58 and a driving mechanism 59 for reciprocating motion of the piston 58. One end of the transverse arm 57 is connected with an outer pipeline 56, and the other end of the transverse arm 57 is connected with a piston 58. The outer pipeline 56 is sleeved on the inner pipeline 55, and there is an oil seal 60 in the gap between the outer pipeline 56 and the inner pipeline 55. When the outer pipeline 56 is pushed by the piston 58 and the transverse arm 57 to the push end position of the reciprocating motion, the outlet end 44 is disconnected from the feed port 13 and is away from the feed inlet 13 (as shown in FIG. 14), the outlet end 44 is in communication with the feed inlet 13 when pushed to the retraction end position of the reciprocating motion by the piston 58 and the transverse arm 57 (as shown in FIG. 15). The gate 32 includes a gate plate 61, a transverse arm 62, a piston 63 and a driving mechanism 64 for reciprocating motion the piston 63. One end of the transverse arm 62 is connected with the gate plate 61, and the other end of the transverse arm 62 is connected with a piston 63. When the gate plate 61 is driven to the end of the reciprocating thrust by piston 63 and transverse arm 62, the gate plate 61 covers the feed inlet 13. The gate plate 61 leaves the feed inlet 13 when pushed by the piston 63 and the transverse arm 62 to the retractable end position of the reciprocating motion.

The gate plate 32 on the feed inlet 13 communicated with the movable feeding pipeline 43 is in an open state (as shown in FIG. 15), so that the raw materials can enter the furnace smoothly. Gate 32 on the feed inlet 13 disconnected from the outlet 44 of movable feeding pipeline 43 is in a closed state (as shown in FIG. 14), to prevent high temperature gas leakage from the furnace. The operator can conveniently open the gate 32 and close it after inspecting or cleaning the bonded material on the inner wall 29 of the feed inlet 13.

In the above embodiment, the airflow passage 22 may be replaced by an adhesive separator disclosed in the U.S. Pat. No. 8,747,524 B2. The adhesive separator has an air inlet and an air outlet, the high-temperature gas carrying the molten dust can be imported from the air inlet, and the purified high-temperature gas can be exported from the air outlet. Therefore, the adhesive separator essentially has the function of allowing high-temperature air flow through, which is provided by the airflow passage 22, and belongs to an airflow channel. The use of the adhesive separator is very simple and is illustrated by means of the ninth embodiment as following.

Ninth Embodiment of the Present Invention

Figure 16:
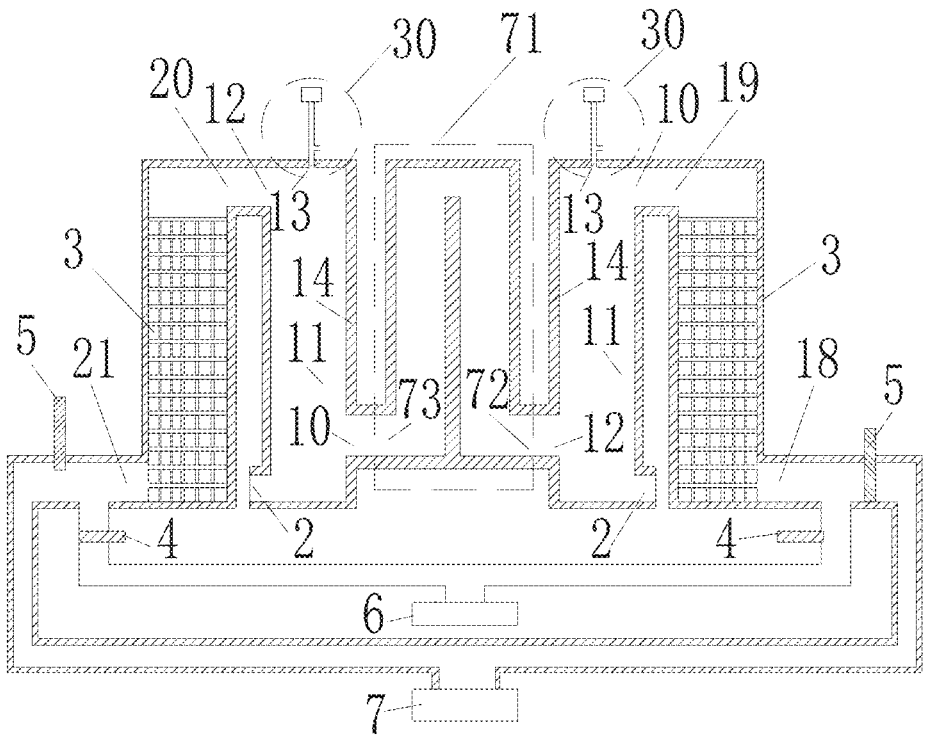
FIG. 16 is a structure schematic diagram of the powder-material flying melting furnace having dual regenerative chambers according to a ninth embodiment of the present invention.

Referring to FIGS. 16 and 6 (the enlarged views of the dotted circle 30 in FIGS. 5 and 16 are the same as shown in FIG. 6), the ninth embodiment of the powder-material flying melting furnace having dual regenerative chambers of the present invention almost has the same structure as that of the third embodiment. The difference between the ninth embodiment and the third embodiment of the present invention lies in that: the airflow passage 22 in the third embodiment of the present invention is replaced by an adhesive separator represented by a dotted block 71. The adhesive separator 71 in FIG. 16 includes an air inlet 72 and an air outlet 73. The air inlet 72 is in communication with an air outlet 12 of one furnace, and the air outlet 73 is in communication with an air inlet 10 of another furnace.

In FIG. 16, the adhesion separator 71 and the two furnaces form a series structure which can make the molten dust in the high-temperature gas purified more thoroughly, and avoid the molten dust entering the feed inlet in the stop feeding state, thereby playing the role of avoiding or reducing the blockage.

In the above embodiment, the exhaust equipment 7 may use an induced draft fan or a chimney (the chimney cannot be used when the solid fuel is gasified), and the oxygen-containing gas input equipment 6 may use a blower. Any value of furnace pressure from negative to positive can be controlled by adjusting the difference between the pumping force of exhaust equipment 7 and the pressure of oxygen-containing gas input equipment 6. When the exhaust equipment 7 is an induced draft fan or a chimney, an air inlet can be set as an oxygen-containing gas input device 6 to input outside air. If an oxygen-containing gas input equipment 6 uses a blower, an exhaust port (in solid fuel gasification, the exhaust port into the exhaust pipe) can be used as exhaust equipment 7 to discharge gas (exhaust gas in fuel gasification, gas can be transported from the exhaust pipeline to the gas point).

The furnace also includes a hearth 11 and a furnace wall 14, wherein the feed inlet 13, the air inlet 10 and the air outlet 12 are arranged on the furnace wall 14 respectively. Raw material feeding equipment 1 is used for feeding powder material into the furnace via the feed inlet 13. Raw material feeding equipment 1 can adopt equipment used for feeding powder material, such as impeller feeder and screw feeder. Other conventional equipment may also be used, provided that the powder material can be fed into the common feed pipeline 17 or the inlet end 16 of the raw material feeding pipeline 9. The powder-material flying melting furnace having dual regenerative chambers also has drain outlet 2. The drain outlet 2 is located at or near the bottom of the hearth 11, and the molten dust adhered to the furnace wall 14 flows to the drain outlet 2 and output under the action of gravity. The hearth 11 has a shape of cylinder. The air Inlet 10 and the air outlet 12 are located near and tangentially connected to both ends of the cylindrical hearth 11 respectively, and the feed inlet 13 is substantially positioned at the top center of the cylindrical hearth 11.

When the embodiment is used for producing glass, iron and copper, the oxygen-containing gas can use air or oxygen-enriched air, and the fuel can use powdered solid fuel, gaseous fuel or liquid fuel. If powder solid fuel or gaseous fuel is used, the powder solid fuel may be mixed in the powder raw material and fed into the furnace from the raw material feeding pipeline. A gas fuel inlet can be opened on the raw material feeding pipeline to input the gas fuel, which is very convenient. When the embodiment is used for iron-making, the powder solid fuel is usually pulverized coal.

When the embodiment is used for gasification of solid fuel, the oxygen-containing gas usually also contains a portion of water vapor. If the calorific value of the gas needs to be increased, a mixture of oxygen and water vapor may be used.

The above described embodiments are only preferred embodiments of the present invention, and are not intended to limit the scope of the present invention. Any modification, equivalent replacement and improvement within the spirit and principle of the present invention should be included in the protection scope of the present invention.

What is claimed is:

1. A powder-material flying melting furnace having dual regenerative chambers comprising two melting furnaces and an oxygen-containing gas preheating system, the oxygen-containing gas preheating system comprising two regenerative chambers, two inlet reversing gates, two outlet reversing gates, an oxygen-containing gas input equipment and an exhaust equipment, wherein one of the two regenerative chambers is used for preheating the oxygen-containing gas and the other regenerative chamber is used for cooling high-temperature gas product, the regenerative chamber for preheating the oxygen-containing gas comprises a gas inlet and a preheating gas outlet, the regenerative chamber for cooling the high-temperature gas product comprises a high temperature gas inlet and a cooling gas outlet; the oxygen-containing gas input equipment is in communication with the gas inlet via a first air inlet reversing gate in an open state, and is in communication with the cooling gas outlet via a second inlet reversing gate in a closed state; the exhaust equipment is in communication with the cooling gas outlet via a first exhaust reversing gate in an open state, and is in communicate with the gas inlet via a second exhaust reversing gate in a closed state; a first melting furnace comprises a raw material feeding equipment, an air inlet, an air outlet, an feed inlet and a raw material feeding pipeline; the raw material feed pipeline of the first melting furnace comprises an outlet end and an inlet end, wherein the outlet end is in communication with the feed inlet of the first melting furnace, and the inlet end is in communication with the raw material feeding equipment; the preheating gas outlet is in communication with the air inlet of the first melting furnace, the raw material feeding equipment of the first melting furnace is in a start feeding state, and the air outlet of the first melting furnace is in communication with an air inlet of a second melting furnace, the raw material feeding equipment of the second melting furnace is in a stop feeding state, and the air outlet of the other melting furnace is in communication with the high-temperature gas inlet; a blow gas inlet is arranged on the raw material feeding pipeline.

2. The powder-material flying melting furnace having dual regenerative chambers of claim 1, wherein the blow gas inlet is provided with a blow gas input line, and a valve is arranged on the blow gas input line.

3. The powder-material flying melting furnace having dual regenerative chambers of claim 1, for use in glass production, iron-making, copper smelting or solid fuel gasification.

4. A powder-material flying melting furnace having dual regenerative chambers comprising two melting furnaces, a raw material feeding equipment and an oxygen-containing gas preheating system, the oxygen-containing gas preheating system comprises two regenerative chambers, two inlet reversing gates, two outlet reversing gates, an oxygen-containing gas input equipment and an exhaust device, wherein one of the two regenerative chambers is used for preheating the oxygen-containing gas and the other regenerative chambers is used for cooling a high-temperature gas product, the regenerative chamber for preheating the oxygen-containing gas comprises an air inlet and a preheating gas outlet, the regenerative chamber for cooling high temperature gas product comprises a high temperature gas inlet and a cooling gas outlet; the oxygen-containing gas input equipment is in communication with the gas inlet via a first inlet reversing gate in an open state, and is in communication with the cooling gas outlet via a second inlet reversing gate in a closed state; the exhaust equipment is in communication with the cooling gas outlet via the first exhaust reversing gate in an open state, and is in communication with the gas inlet via a second exhaust reversing gate in a closed state; a first melting furnace comprises a feeding reversing gate, a raw material feeding pipeline, an air inlet, an air outlet and a feed inlet; the raw material feeding pipeline of the first melting furnace comprises an outlet end and an inlet end, wherein the outlet end is in communication with the feed inlet of the first melting furnace, and the inlet end is in communication with the feeding reversing gate of the first melting furnace; feeding reversing gates of the two melting furnaces are connected with the raw material feeding equipment via a common feed pipeline respectively; the preheating gas outlet is in communication with the air inlet of the first melting furnace, and the feeding reversing gates of the melting furnaces are in an open state, the air outlet of the first melting furnace is in communication with the air inlet of a second melting furnace, and the feeding reversing gate of the second melting furnace is in a closed state, and the air outlet of the second melting furnace is in communication with the high temperature gas inlet; a blow gas inlet is arranged on a common feed pipeline.

5. The powder-material flying melting furnace having dual regenerative chambers of claim 4, wherein the air outlet of the first melting furnace is in communication with the air inlet of the second melting furnace via an adhesion separator.

6. A powder-material flying melting furnace having dual regenerative chambers comprising two melting furnaces and an oxygen-containing gas preheating system, the oxygen-containing gas preheating system comprising two regenerative chambers, two inlet reversing gates, two outlet reversing gates, an oxygen-containing gas input equipment and an exhaust device, wherein one of the two regenerative chambers is used for preheating the oxygen-containing gas and the other regenerative chamber is used for cooling the high-temperature gas product, the regenerative chamber for preheating oxygen-containing gas comprises a gas inlet and a preheating gas outlet, the regenerative chamber for cooling a high-temperature gas product comprises a high temperature gas inlet and a cooling gas outlet, the oxygen-containing gas input equipment is in communication with the gas inlet via a first inlet reversing gate in an open state, and is in communication with the cooling gas outlet via a second inlet reversing gate in a closed state; the exhaust device is in communication with the cooling gas outlet via a first exhaust reversing gate in an open state, and is in communication with the gas inlet via a second exhaust gas reversing gate in a closed state; a first melting furnace comprises a raw material feeding equipment, an air inlet, an air outlet, a feed inlet and a raw material feeding pipeline, the raw material feeding pipeline of the first melting furnace comprises an outlet end and an inlet end, the outlet end is in communication with the feed inlet of the melting furnace, and the inlet end is in communication with the raw material feeding equipment; the preheating gas outlet is in communication with the air inlet of the first melting furnace, the raw material feeding equipment of the first melting furnace is in a start feeding state, and the air outlet of the first melting furnace is in communication with an air inlet of a second melting furnace, the material feeding equipment of the second melting furnace is in a stop feeding state, and an air outlet of the other melting furnace is in communication with a high-temperature gas inlet; the feed inlet is provided with a forced feeding equipment, the forced feeding equipment pushes the powder raw material from the raw material feeding pipeline into the feed inlet by mechanical thrust.

7. The powder-material flying melting furnace having dual regenerative chambers of claim 6, wherein the forced feeding equipment comprises a push rod, a rod receiving chamber, a piston and a driving mechanism for reciprocating motion of the piston; the rod receiving chamber is connected with the inlet end of the raw material feeding pipeline, the outer diameter of the push rod is adapted to an inner diameter of the raw material feeding pipeline; a tail end of the push rod is connected with the piston, when a top end of the push rod is pushed by the piston to a retraction end point of the reciprocating movement, the push rod retreats into the rod receiving chamber, and when pushed by the piston to a push end point of the reciprocating movement, the push rod reaches the feed inlet; the tail end of the push rod is located in the rod receiving chamber when pushed by the piston to the push end position of the reciprocating movement.

8. The powder-material flying melting furnace having dual regenerative chambers of claim 6, wherein the forced feeding equipment comprises a spring-shaped helical blade and a mechanically driven rotating shaft; the helical blade is arranged in the raw material feeding pipeline, the rotating shaft is arranged on a central line of the helical blade, and the rotating shaft is fixedly connected with the helical blade.

9. A powder-material flying melting furnace having dual regenerative chambers comprising two melting furnaces and an oxygen-containing gas preheating system, the oxygen-containing gas preheating system comprising two regenerative chambers, two inlet reversing gates, two outlet reversing gates, an oxygen-containing gas input equipment and an exhaust equipment, wherein one of the two regenerative chambers is used for preheating the oxygen-containing gas and the other regenerative chamber is used for cooling high-temperature gas product, the regenerative chamber for preheating oxygen-containing gas comprises a gas inlet and a preheating gas outlet, the regenerative chamber for cooling high temperature gas product comprises a high temperature gas inlet and a cooling gas outlet; the oxygen-containing gas input equipment is in communication with the gas inlet via a first inlet reversing gate in an open state, and is in communication with the cooling gas outlet via a second inlet gas reversing gate in a closed state; the exhaust equipment is in communication with the cooling gas outlet via a closed first inlet reversing gate, the exhaust equipment is in communication with the cooling gas outlet via a first exhaust reversing gate in an open state, and is in communication with the gas inlet via a second exhaust reversing gate in a closed state; a first melting furnace comprises a raw material feeding equipment, a raw material feeding pipeline, an air inlet, an air outlet and an feed inlet; the feeding pipeline is a movable feeding pipeline, and an outlet end of the movable feeding pipeline is movably connected with the feed inlet; the preheating gas outlet is in communication with an air inlet of the first melting furnace, the feed inlet of the first melting furnace is in communication with the raw material feeding equipment via a movable feeding pipeline, the air outlet of the first melting furnace is in communication with the air inlet of a second melting furnace, and the air outlet of the second melting furnace is in communication with the high temperature gas inlet.

10. The powder-material flying melting furnace having dual regenerative chambers of claim 9, wherein a feed inlet of the second melting furnace is disconnected from an outlet end of the movable feeding pipeline, and the feed inlet is provided with a gate.

\* \* \* \* \*